United States Patent [19]

Lalonde

[11] 3,859,931

[45] Jan. 14, 1975

[54] FOLDABLE TABLE UNIT FOR AN AUTOMOBILE

[76] Inventor: Alexandre Roger Lalonde, 98 Charette St., Chelmsford, Ontario, Canada

[22] Filed: Oct. 1, 1973

[21] Appl. No.: 402,351

[52] U.S. Cl................. 108/44, 108/149, 312/245
[51] Int. Cl........................................ A47b 23/04
[58] Field of Search............ 108/42, 44, 45, 46, 48, 108/161, 149; 248/284, 317; 312/245, 249, 317 R; 5/10 R

[56] References Cited
UNITED STATES PATENTS

| | | | |
|---|---|---|---|
| 1,466,746 | 9/1923 | Ohlen | 248/284 X |
| 1,880,621 | 10/1932 | Willetts | 108/42 |
| 1,891,834 | 12/1932 | Pendleton | 108/45 |
| 1,951,261 | 3/1934 | Thompson | 108/45 X |
| 2,530,876 | 11/1950 | Harris | 108/45 X |
| 2,818,317 | 12/1957 | Little, Jr. | 108/44 |
| 3,606,112 | 9/1971 | Cheshier | 108/45 X |
| 3,785,300 | 1/1974 | Anderson | 108/44 |

Primary Examiner—Roy D. Frazier
Assistant Examiner—William E. Lyddane

[57] ABSTRACT

A table unit arranged to be mounted into an automobile against the roof thereof and unfoldable towards a lowered operative position adjacent the dash of the automobile for the convenience of persons sitting on the front seat. This foldable table unit is pivoted to pendulously swing towards the lowered operative position, such that the pivoted parts thereof, under their weight rest in predetermined and adjustable angular relationship and are biased against definite abutments. This unit is hinged to fit different longitudinal profiles of roofs of automobiles and includes convenient storage and carrying compartments.

5 Claims, 5 Drawing Figures

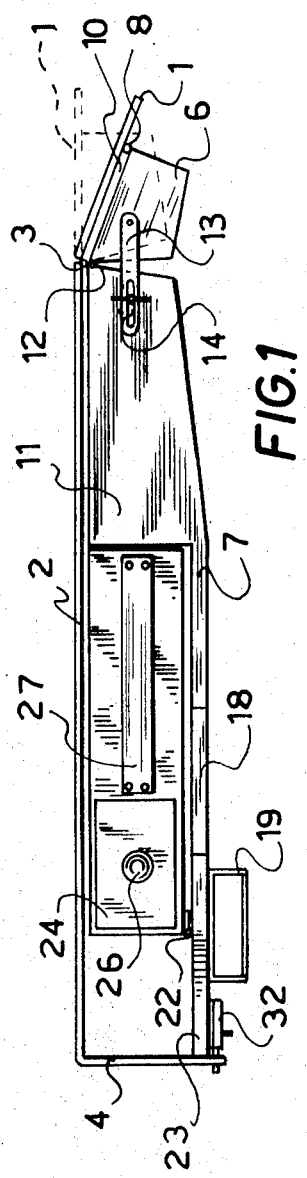
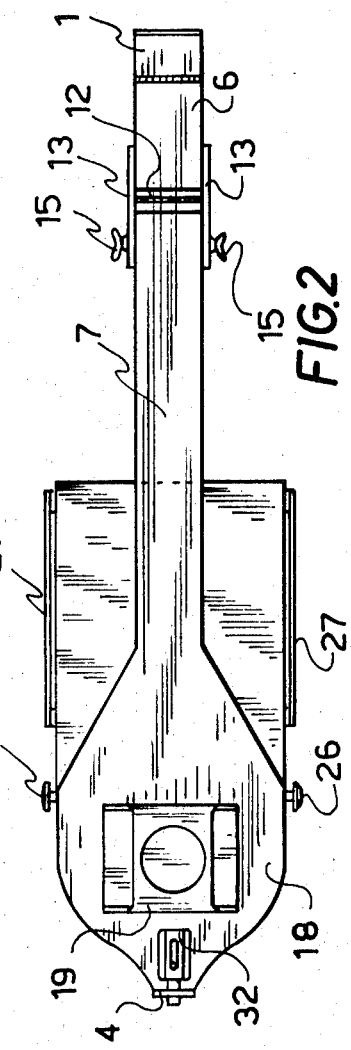
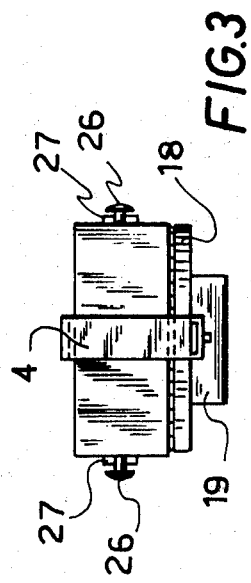

FOLDABLE TABLE UNIT FOR AN AUTOMOBILE

This invention relates to a table unit of the type adapted to be foldably mounted into an automobile for the convenience of persons into the latter.

The pertinent prior art defines many table units of the above type which are, in most cases, particularly adapted to be mounted behind the front seat for the convenience of persons sitting on the rear seat. These rear seat table units are not adapted to be mounted in front for the convenience of persons sitting on the front seat. Other foldable table units of the above type have been adapted to be mounted in front for the convenience of persons sitting on the front seat. These other table units are arranged to be lowered in inoperative position under the dash of the automobile. This mounting under the dash is found unsatisfactory since it imposes serious structural limitations downgrading the utility of such table unit and the universality of use thereof in different automobiles.

It is a general object of the invention to provide a foldable table unit of the above type which is particularly adapted to be supported from the roof of the automobile and to be operatively lowered for the convenience of persons sitting on the front seat.

It is another general object of the invention to provide a foldable table unit of the above type which is pivotally supported in a simple manner for simplicity of construction and use.

It is another object of the invention to provide a foldable table unit of the above type which may be readily secured against the roof of an automobile and which is adjustable to generally fit the longitudinal profile thereof, for generally universal mounting in different models of automobiles.

It is a more specific object of the invention to provide a foldable table unit of the above type which is pivotally suspended from the roof of an automobile to pendulously swing to a lowered operative position wherein the weight of the pivoted parts thereof biases the latter against abutments into predetermined angular relationship to produce simple construction and pivoting, which is angularly adjustable to set the angular relationship of the table according to the automobile and which also includes convenient storage and carrying compartments.

The above and other objects and advantages of the invention will be better understood in the light of the following detailed description of a preferred embodiment thereof which is illustrated, by way of example only, in the accompanying drawings, wherein:

FIG. 1 is a side view of a foldable table unit for an automobile, shown in elevated inoperative position according to the invention;

FIG. 2 is a bottom view of the foldable unit when the latter is in the elevated position shown in FIG. 1;

FIG. 3 is an end view as seen from the left in FIG. 1;

The illustrated foldable table unit includes a mounting plate or bracket 1 and a strip or bar 2 which are aligned with each other and pivoted at adjoining ends by a hinge 3, of any suitable type, defining a transverse axis relative to the bar 2 and the mounting bracket 1. Both the mounting bracket 1 and the bar 2 are arranged to be secured against the roof of an automobile and to project lengthwise along the longitudinal centerline thereof. The hinge 3 allows to fit the mounting bracket 1 to various inclinations taken by different roofs above the windshield, while fitting the bar 2 against the more even main portion of the roof overlying the front seat of the car. The rear end of the bar 2 terminates into a downward projection 4, the purpose of which will be better defined latter.

Figure 4:
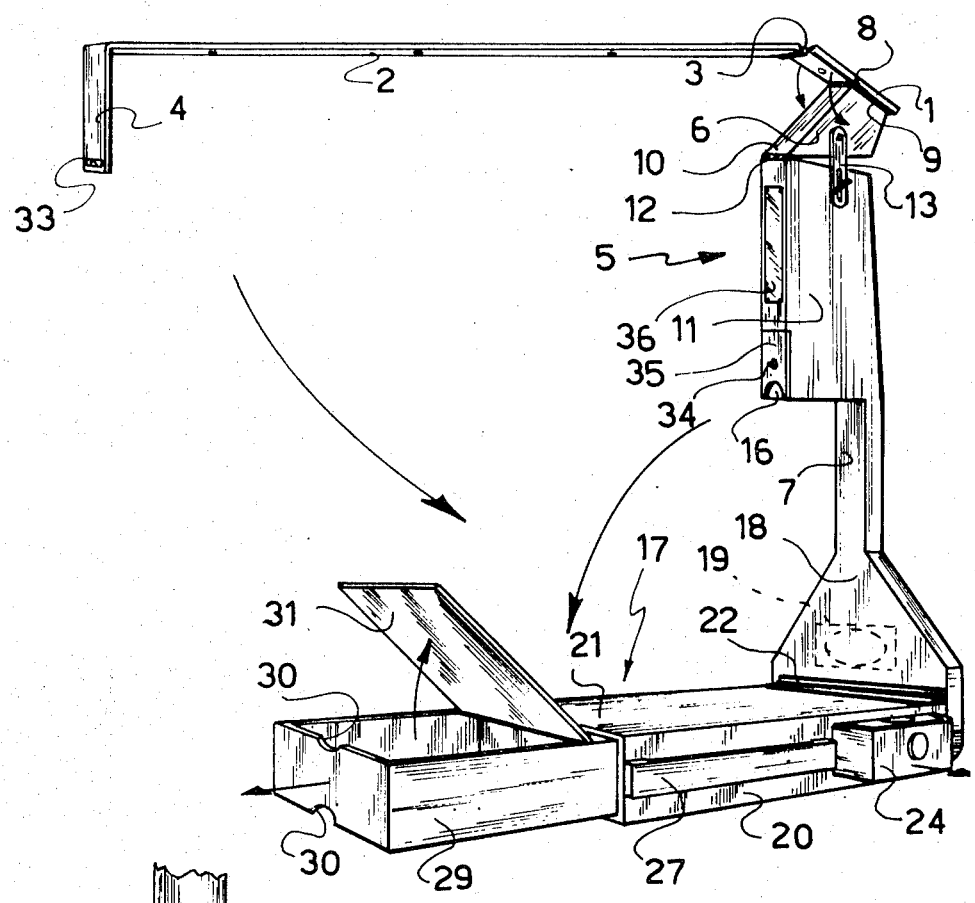
FIG. 4 is a perspective view of the foldable table unit of FIG. 1 but shown unfolded to a lowered operative position.

The foldable table unit includes a supporting arm 5 having an upper angular adjustment arm section 6 and a lower arm section 7. An hinge 8 pivotally joins the angular adjustment arm section 6 to the mounting bracket 1 defining another pivot axis extending parallel to the pivot axis of the hinge 3. The angular adjustment arm section 6 has a face 9 forming an abutment adapted to engage against the mounting bracket 1 to define the angular relationship between the latter and the arm 5 when the latter is pendulously swung to the lowered operative position, as shown in FIG. 4. The angular adjustment arm section 6 includes another face 10 arranged at 90° to the face 9 and having such length that when the foldable table unit is folded into the elevated position, as shown in FIG. 1, the face 10 lies against the mounting bracket 1 with the hinge 8 underlying the hinge 3.

The lower main arm section 7 includes a housing portion 11 at the upper end thereof. The lower main arm section 7 is hinged at 12 to the angular adjustment arm section 6 about another transverse axis extending parallel to the axes defined by the hinges 3 and 8. A pair of angular adjustment setting tongues 13 are arranged on opposite sides respectively of the angular adjustment arm section 6 and of the housing portion 11. The angular adjustment setting tongue 13 is pivoted at one end to the angular adjustment arm section 6 and has a slot 14 extending lengthwise thereof through which projects a bolt. A wing nut 15 engages each bolt to tightly secure the latter at a desired position along the corresponding slot 14, thus defining the angular relationship between the arm portions 6 and 7.

Figure 5:
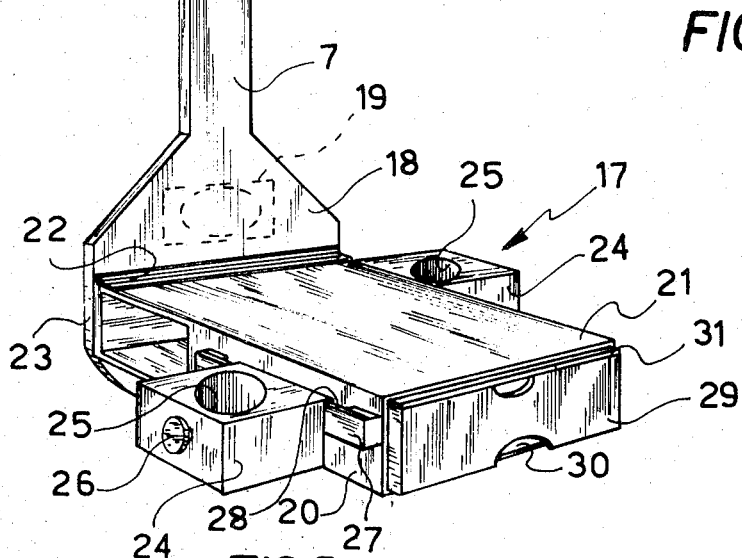
FIG. 5 is a partial perspective view of the foldable table unit of the preceding Figures particularly illustrating the table forming portion thereof.

The housing portion 11 houses an illuminating device, of any suitable type, not shown, which may preferably be wired in any appropriate manner to be connected to the ordinary d.c. circuitry of the automobile. The lower end of the housing portion 11 forms an operatively downwardly facing opening, at 16, for overlying illumination of the table forming section 17 when the latter is in its operative position, such as in FIGS. 4 and 5.

The supporting arm portion 7 includes a wider end portion 18 forming a substantially flat board. A holder 19 is secured against the operatively forward face of the wider arm portion 18 and is preferably adapted to carry a pocket size pack of tissue papers or handkerchiefs, although it could as well carry napkins or the like wiping tissue.

The afore-mentioned table forming portion 17 includes a casing 20, of rectangular outline, having a flat surface forming a table top 21. A piano type hinge 22 pivotally secures the casing 20 against the operatively rearward face of the wider arm portion 18, such that the latter has an end portion 23 forming an abutment for the casing 20. For that purpose, the hinge 22 is arranged such that the casing 20 pivots substantially about the edge at one end of the table top 21.

A pair of cup or glass carrying drawers 24 are slidably engageable transversely into the casing 20 from oposite sides thereof adjacent the hinge 22. A cavity 25 is formed into each drawer 24 to hold a cup or glass. A knob 26 is secured against the front face of each drawer 24 to actuate the latter. A bar 27 is secured longitudinally against each of the two opposite sides of the casing 21 and is outwardly spaced therefrom to form a ledge 28. Each drawer 24 forms a downwardly direct hooking flange at the inner end thereof adapted to hook over the ledge defined by each bar 27. Thus, a cup or glass may be conveniently carried therein, as shown on the left side of the casing in FIG. 5.

A main drawer 29 slidably engages into the casing 20 through the free open end thereof and is provided to conveniently carry any desired and commonly used item such as paper, stamps, notebooks, envelopes, pen, road maps, combs, etc. The front board of the drawer 29 is notched at 30 to provide suitable grip to open the same. The drawer 29 may conveniently include a hinged cover 31.

A spring latch 32, of any suitable type, is secured against the operatively forward side of the abutment portion 23 of the arm portion 7 and is arranged to releasably engage into a suitable aperture 33 of the downward projection 4, to hold the pivotable parts of the unit in elevated inoperative position, as best shown in FIG. 1. It must be noted that in this latter position, the table forming portion 17 rests onto the arm portion 7 endwise of the housing portion 11. The latter conveniently also includes a switch 34 to actuate the aforementioned illumination device and a service door 35 to reach the latter, such as to change a light bulb thereof. A mirror 36 may be secured against the operatively rearward face of the housing portion 11.

The foldable table unit according to the present invention is secured into an automobile by fixing the mounting plate or bracket 1 against the inclined portion of the roof immediately above the windshield such that the supporting bar 2 may thereafter be fitted along the longitudinal center line of the roof. The hinge 3 allows to follow the usual longitudinal profile of the roof characterized by an upwardly inclined portion adjacent the windshield and a generally level portion rearwardly of the inclined portion.

It must be noted that under the weight of the pivoted parts of the unit the latter will be biased into a preset angular configuration by engagement of the abutment face 9 with the mounting bracket 1 and of the abutment portion 23 of the arm portion 7 with the adjoining end of the casing 20.

What I claim is:

1. A foldable table unit for an automobile comprising an elongated mounting bracket adapted to be secured to the roof of an automobile inside the passenger compartment, a rigid supporting arm means hinged at one end to said mounting bracket about a first hinge axis, a table hinged at one end to the other end of said support arm means about a second hinge axis, said hinge axes being parallel and extending in a direction transverse to the longitudinal axis of said bracket, said supporting arm means having a first abutment at said one end and a second abutment at said other end resting against said mounting bracket and against said table respectively, in the operative position of said unit, and defining a predetermined angular relationship between said bracket and said supporting arm means, and between the latter and said table respectively, said supporting arm means hanging down from said bracket and said table horizontally extending in cantilevered fashion from said supporting arm means in said operative position of said unit, said table foldable against said supporting arm means about said second axis and said supporting arm means together with said table foldable against said automobile roof about said first axis to an elevated inoperative position, and means to releasably maintain said table and supporting arm means in said elevated inoperative position.

2. A foldable table unit as defined in claim 1, wherein said second abutment is angularly adjustable relative to said supporting arm means to adjustably vary the angular relationship between said mounting bracket and said supporting arm means in the operative position of said unit, and further including means to releasably secure said second abutment in adjusted angular position relative to said supporting arm means.

3. A foldable table unit as defined in claim 2, wherein said supporting arm means includes a first arm section and a second arm section, said first arm section includes said first abutment and is hingedly connected to said second arm section about a third hinge axis extending parallel to said first hinge axis and said securing means includes an adjustment link connecting said first arm section to said second arm section.

4. A foldable table unit as defined in claim 1, wherein said bracket includes a longer bar and a shorter bar, hinged together for angular adjustment about a fourth hinge axis extending parallel to said first hinge axis for longitudinally adjustably fitting said bracket against an automobile roof of variable longitudinal profile, said supporting arm means hinged to said shorter bar about said first hinge axis, said means to releasably maintain said table and supporting arm means in elevated inoperative position including a latch means carried by said longer bar and releasably engageable with said other end of said supporting arm means.

5. A foldable table unit as defined in claim 1, wherein said table includes a casing forming a table top, and cup carrying members removably storable within said casing, said casing having two bars secured longitudinally along two opposite sides of said casing and outwardly projecting to form a ledge, said cup carrying members having a hooking flange for hooking over said ledge.

* * * * *